2,985,632

GR–S CURED WITH DICAMYL PEROXIDE AND SULFUR

William D. Willis, Wilmington, Del., assignor to Hercules Powder Company, Wilmington, Del., a corporation of Delaware No Drawing. Filed Dec. 4, 1956, Ser. No. 626,076

4 Claims. (Cl. 260—79.5)

This invention relates to the art of rubber compounding and more particularly to improved rubber composition.

It has recently been found that certain organic peroxides of the general formula:

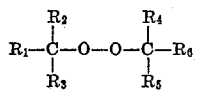

where $R_1$ and $R_6$ are aryl groups and $R_2$, $R_3$, $R_4$, and $R_5$ are hydrogen or alkyl groups of less than 4 carbon atoms, are extremely effective vulcanizing agents for both natural and synthetic rubber. In fact, through the use of this class of peroxides as a vulcanizing agent for all types of rubber, it is possible to produce vulcanizates which are superior in many respects to vulcanized rubbers prepared using any other vulcanizing agent known to the art.

In accordance with the present invention, it has been found that in the vulcanization of synthetic rubber prepared by the copolymerization of a major amount of butadiene and a minor amount of styrene (generally known as GR–S) there is advantage to be gained by employing as the vulcanizing agent a combination of sulfur and a peroxide of the formula given above. The invention is thus directed to the vulcanizable rubber composition comprising a synthetic rubbery copolymer of butadiene and styrene and minor amounts, effective to promote vulcanization at an elevated temperature, of sulfur and a di(aralkyl) peroxide having the structural formula:

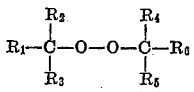

where $R_1$ and $R_6$ are aryl groups and $R_2$, $R_3$, $R_4$, and $R_5$ are selected from the class consisting of hydrogen and alkyl groups of less than 4 carbon atoms. A particularly preferred species of peroxide is bis($\alpha,\alpha$-dimethylbenzyl) peroxide.

Through the practice of the invention, it is possible to prepare vulcanizates of improved physical properties, in particular, vulcanizates having improved tensile strength and modulus. This will be illustrated by the following example in which parts and percentages are by weight.

EXAMPLE

Using a conventional two roll rubber mill, a rubbery butadiene-styrene copolymer (GR–S X732) was blended with disproportionated rosin in the ratio of 80 parts of the former to 20 parts of the latter. This rosin-extended synthetic rubber was then blended with additional ingredients in preparing two homogeneous compositions of the following formulation:

Table I

|  | A | B |
| --- | --- | --- |
| Rosin-extended GR–S X732 | 100 | 100 |
| Furnace black | 50 | 50 |
| Zinc oxide | 5.0 | 5.0 |
| Stearic acid | 2.0 | 2.0 |
| N-cyclohexyl-2-benzothiazole sulfenamide | 1.0 | 1.0 |
| Tetramethyl thiuram disulfide | 0.1 | 0.1 |
| Sulfur | 2.0 | 2.0 |
| Bis($\alpha,\alpha$-dimethylbenzyl) peroxide | | 0.9 |

Both compositions A and B were vulcanized at 300° F. for various lengths of time in a closed mold to provide specimens for the testing of physical properties. The following is a tabulation of the physical properties of the vulcanizates.

Table II

| Cure Time (Minutes) | A | B |
| --- | --- | --- |
| | Modulus at 300% Elongation (p.s.i.) | |
| 15 | 810 | 940 |
| 30 | 2,060 | 2,275 |
| 45 | 2,440 | 2,610 |
| 60 | 2,680 | 2,810 |
| 90 | 2,930 | 3,000 |
| | Tensile Strength (p.s.i.) | |
| 15 | 2,210 | 2,590 |
| 30 | 3,710 | 3,780 |
| 45 | 3,840 | 3,920 |
| 60 | 3,810 | 4,130 |
| 90 | 3,930 | 3,950 |
| | Elongation (%) | |
| 15 | 700 | 700 |
| 30 | 540 | 510 |
| 45 | 470 | 460 |
| 60 | 420 | 450 |
| 90 | 390 | 390 |
| | Shore A Hardness | |
| 15 | 50 | 51 |
| 30 | 59 | 59 |
| 45 | 62 | 61 |
| 60 | 62 | 62 |
| 90 | 62 | 62 |
| | Bashore Resilience | |
| 15 | 23 | 22 |
| 30 | 19 | 20 |
| 45 | 18 | 19 |
| 60 | 17 | 17 |
| 90 | 16 | 16 |

From the preceding data, the improvement in modulus and tensile strength is evident, particularly at cure times of less than 90 minutes.

The peroxides of this invention are di(aralkyl) peroxides having the structural formula:

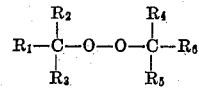

where $R_1$ is an aryl group, $R_2$, $R_3$, $R_4$, and $R_5$ are hydrogen or alkyl groups of less than 4 carbon atoms, and $R_6$ is an aryl group. $R_2$, $R_3$, $R_4$, and $R_5$ may all be the same or each may be a different group or any two or more may be the same or different. Similarly, $R_1$ and $R_6$ may be the same or different aryl groups.

The aryl groups referred to in the above formula may, for example, be phenyl, naphthyl, anthryl, phenanthryl, and the like. The aryl groups may contain alkyl substituents as in the case of methylphenyl, ethylphenyl, propylphenyl, isopropylphenyl, butylphenyl, isobutylphenyl, t-butylphenyl, pentamethylethylphenyl, dimethylphenyl, methylethylphenyl, etc., and corresponding alkyl derivatives of the other aryl groups mentioned. The term "aryl" as used herein includes alkaryl groups. When an alkyl substituent in an aryl group contains less than 4 carbon atoms, it may be the same as or different from any of $R_2$, $R_3$, $R_4$, or $R_5$. Aryl groups in which the alkyl substituents, if any, contain less than 8 carbon atoms are preferred.

The class of di(aralkyl) peroxides of this invention include the following symmetrical or bis(aralkyl) peroxides: dibenzyl peroxide, bis($\alpha$-methylbenzyl) peroxide, bis($\alpha$-ethylbenzyl) peroxide, bis($\alpha$-propylbenzyl) peroxide, bis($\alpha$-isopropylbenzyl) peroxide, bis($\alpha,\alpha$-dimethylbenzyl) peroxide, bis($\alpha$-methyl-$\alpha$-ethylbenzyl) peroxide, bis($\alpha,\alpha$-diethylbenzyl) peroxide, bis($\alpha,\alpha$-dipropylbenzyl) peroxide, bis($\alpha,\alpha$-diisopropylbenzyl) peroxide, bis($\alpha,\alpha$-diisopropylnaphthylmethyl) peroxide, bis($\alpha,\alpha$-dimethylnaphthylmethyl) peroxide, bis($\alpha,\alpha$-dimethyl-p-methylbenzyl) peroxide, bis($\alpha$-methyl-$\alpha$-ethyl-p-methylbenzyl) peroxide, bis($\alpha,\alpha$-diethyl-p-methylbenzyl) peroxide, bis($\alpha,\alpha$-diisopropyl-p-methylbenzyl) peroxide, bis($\alpha,\alpha$-dimethyl-p-ethylbenzyl) peroxide, bis($\alpha$-methyl-$\alpha$-ethyl-p-ethylbenzyl) peroxide, bis($\alpha,\alpha$-diethyl-p-ethylbenzyl) peroxide, bis($\alpha,\alpha$-diisopropyl-p-ethylbenzyl) peroxide, bis($\alpha,\alpha$-dimethyl-p-isopropylbenzyl) peroxide, bis($\alpha$-methyl-$\alpha$-ethyl-p-isopropylbenzyl) peroxide, bis($\alpha,\alpha$-diethyl-p-isopropylbenzyl) peroxide, bis($\alpha,\alpha$-diisopropyl-p-isopropylbenzyl) peroxide, bis($\alpha,\alpha$-dimethyl-p-t-butylbenzyl) peroxide, bis-($\alpha$ - methyl - $\alpha$ - ethyl - p - t - butylbenzyl) peroxide, bis($\alpha,\alpha$-diethyl-p-t-butylbenzyl) peroxide, bis($\alpha,\alpha$-diisopropyl-p-t-butylbenzyl) peroxide, bis($\alpha,\alpha$-dimethyl-p-pentamethylethylbenzyl) peroxide, bis($\alpha$-methyl-$\alpha$-ethyl-p-pentamethylethylbenzyl) peroxide, bis($\alpha,\alpha$-diethyl-p-pentamethylethylbenzyl) peroxide, and bis($\alpha,\alpha$-diisopropyl-p-pentamethylethylbenzyl) peroxide.

Unsymmetrical peroxides of this invention containing two aryl groups include the following compounds: benzyl($\alpha$-methylbenzyl) peroxide, benzyl($\alpha$-methyl-p-methylbenzyl) peroxide, benzyl($\alpha$-methyl-p-isopropylbenzyl) peroxide, benzyl($\alpha,\alpha$-dimethylbenzyl) peroxide, benzyl-($\alpha,\alpha$-dimethyl-p-methylbenzyl) peroxide, benzyl($\alpha,\alpha$-dimethyl-p-isopropylbenzyl) peroxide, $\alpha$-methylbenzyl($\alpha,\alpha$-dimethylbenzyl) peroxide, $\alpha$-methylbenzyl($\alpha,\alpha$-dimethyl-p-methylbenzyl) peroxide, $\alpha$-methylbenzyl($\alpha,\alpha$-dimethyl-p-isopropylbenzyl) peroxide, $\alpha$-isopropylbenzyl($\alpha,\alpha$-diisopropylbenzyl) peroxide, $\alpha,\alpha$-dimethylbenzyl($\alpha,\alpha$-dimethyl-p-methylbenzyl) peroxide, $\alpha,\alpha$-diisopropylbenzyl($\alpha,\alpha$-diisopropyl-p-methylbenzyl) peroxide, and $\alpha,\alpha$-diisopropylbenzyl($\alpha,\alpha$-diisopropyl-p-isopropylbenzyl) peroxide.

In general the peroxides of this invention are characterized by containing at least 14 carbon atoms and usually not more than about 40 carbon atoms. Di(aralkyl) peroxides containing 14 to about 25 carbon atoms are preferred as producing very desirable vulcanizates and because they may be prepared from readily available materials. The symmetrical peroxides of this invention are exceptionally useful since in addition to producing vulcanizates having extraordinary properties they can be prepared in higher yields more easily than the unsymmetrical peroxides. Specific peroxides preferred in this invention are bis($\alpha,\alpha$-dimethylbenzyl) peroxide, bis($\alpha,\alpha$-dimethyl-p-methylbenzyl) peroxide, and bis($\alpha,\alpha$-dimethyl-p-isopropylbenzyl) peroxide.

In addition to the peroxide, the invention also requires the presence of sulfur as a vulcanizing agent in order to obtain the advantages of the invention. The respective quantities of sulfur and of peroxide are, however, widely variable and optimum quantities of each vulcanizing agent will vary according to the nature of the composition, i.e., whether an accelerator is present or not, what type of filler is employed, etc. Generally, however, the amount of peroxide will vary from about 0.01 to about 10% by weight of the rubber and the amount of sulfur will vary from about 0.05 to about 3% by weight of the rubber.

When utilizing the invention, it is apparent that suitable fillers, reinforcing agents, antioxidants, extenders, plasticizers, softeners, processing aids, and other ingredients commonly used in the vulcanization of butadiene-styrene rubber can be employed.

Zinc oxide, reinforcing grades of carbon black, and the like, may be employed as reinforcing agents. Preferably, a mixture of suitable fillers and reinforcing agents is employed to give to the compositions the particular properties which may be desired. Thus, a mixture of zinc oxide and carbon black may be employed in the manner illustrated by the examples. Suitable pigments, such as ultramarine, vermillion, or the like, may be employed to impart to the composition a desired color.

As a means for obtaining vulcanization of the composition at lower temperatures or for increasing the rate of vulcanization suitable accelerators may be employed. Accelerators which are familiar to the art are, in general, satisfactory. The effects of various accelerators upon the vulcanization of the composition and upon its properties after vulcanization vary somewhat and thereby provide means for controlling certain of the properties of the vulcanized product.

The use of the various fillers, antioxidants, and the like hereinbefore mentioned is well known, and one skilled in the art will have no difficulty in arriving at a formulation suitable for a particular need.

Preparation of the vulcanizable composition and the vulcanization procedure follow the practices of the art. The compositions are prepared, for example, by the simple practice of milling the ingredients together on any of the common types of milling apparatus. Vulcanization is effected by heating to a temperature ranging from about 270–375° F. and optimum temperatures within this range will vary according to the nature of the compounding ingredients.

What I claim and desire to protect by Letters Patent is:

1. A vulcanizable rubber composition comprising a synthetic rubbery copolymer of butadiene and styrene, sulfur in an amount from about 0.05 to about 3% by weight of the rubbery copolymer and bis($\alpha,\alpha$-dimethylbenzyl) peroxide in an amount from about 0.01 to about 10% by weight of the rubbery copolymer.

2. The composition of claim 1 wherein there also is present a vulcanization accelerator selected from the group consisting of N-cyclohexyl-2-benzothiazole sulfenamide, tetramethyl thiuram disulfide and mixtures thereof.

3. The process for preparing a vulcanized rubber which comprises heating to a temperature ranging from about 270° to 375° F. a synthetic rubbery copolymer of butadiene and styrene, sulfur in an amount from about 0.05 to about 3% by weight of the rubbery copolymer and bis-($\alpha,\alpha$-dimethylbenzyl) peroxide in an amount from about 0.01 to about 10% by weight of the rubbery copolymer.

4. The process of claim 3 wherein there also is present a vulcanization accelerator selected from the group consisting of N-cyclohexyl-2-benzothiazole sulfenamide, tetramethyl thiuram disulfide and mixtures thereof.

References Cited in the file of this patent

UNITED STATES PATENTS

| 1,249,181 | Ostromislensky | Dec. 4, 1917 |
| 2,426,476 | Vaughan et al. | Aug. 26, 1947 |
| 2,668,180 | Boardman | Feb. 2, 1954 |
| 2,691,683 | Lorand et al. | Oct 12, 1954 |
| 2,717,914 | Harbison | Sept. 13, 1955 |
| 2,819,256 | Boardman | Jan. 7, 1958 |